United States Patent
Tamagawa

[19]

[11] Patent Number: 6,127,813
[45] Date of Patent: Oct. 3, 2000

[54] CONTROL SYSTEM FOR HYBRID VEHICLE

[75] Inventor: Yutaka Tamagawa, Wako, Japan

[73] Assignee: Honda Giken Kogyo Kabushiki Kaisha, Tokyo, Japan

[21] Appl. No.: 09/280,707

[22] Filed: Mar. 30, 1999

[30] Foreign Application Priority Data

Mar. 31, 1998 [JP] Japan .................................. 10-086065

[51] Int. Cl.$^7$ ..................................................... H02P 9/04
[52] U.S. Cl. ........................... 322/16; 290/40 C; 318/140
[58] Field of Search ................................. 322/14, 15, 16, 322/17; 290/40 C; 318/139, 140, 141

[56] References Cited

U.S. PATENT DOCUMENTS

| | | | |
|---|---|---|---|
| 5,545,928 | 8/1996 | Kotani ................................... | 290/40 C |
| 5,614,809 | 3/1997 | Kiuchi et al. .............................. | 322/11 |
| 5,867,009 | 2/1999 | Kiuchi et al. .............................. | 322/16 |
| 5,929,608 | 7/1999 | Ibaraki et al. ............................. | 322/16 |
| 5,939,794 | 8/1999 | Sakai et al. ............................ | 290/40 A |
| 5,939,848 | 8/1999 | Yano et al. ............................. | 318/139 |
| 5,966,000 | 10/1999 | Yang ........................................ | 322/23 |
| 5,994,881 | 11/1999 | Miyazaki et al. .......................... | 322/16 |

FOREIGN PATENT DOCUMENTS 8-182113   7/1996   Japan .

*Primary Examiner*—Nick Ponomarenko
*Attorney, Agent, or Firm*—Arent Fox Kintner Plotkin & Kahn, PLLC

[57] ABSTRACT

A hybrid vehicle has an engine as a propulsive power unit for the hybrid vehicle, an electric energy storage device for storing electric energy, and a generator motor operable alternatively as an electric motor for generating an assistive output power to be added to an output power generated by the engine, from the electric energy stored by the electric energy storage device, and as an electric generator for regenerating electric energy to be charged into the electric energy storage device. A control system regards an integrated charged quantity which represents an integrated value of electric energy quantity charged from the generator motor into the electric energy storage device when the generator motor operates as the electric generator, as an allowable discharged quantity of the electric energy storage device when the generator motor operates as the electric motor, and limits an integrated discharged quantity which represents an integrated value of electric energy quantity discharged from the electric energy storage device when the generator motor operates as the electric motor, within the allowable discharged quantity. The control system also corrects the allowable discharged quantity depending on the electric energy quantity stored by the electric energy storage device when the generator motor starts operating as the electric motor.

7 Claims, 7 Drawing Sheets

STORED ELECTRIC ENERGY QUANTITY $\leqq C_x$

STORED ELECTRIC ENERGY QUANTITY $> C_x$

CONTROL SYSTEM FOR HYBRID VEHICLE

BACKGROUND OF THE INVENTION

1. Field of the Invention

The present invention relates to a control system for controlling a parallel hybrid vehicle.

2. Description of the Related Art

Some parallel hybrid vehicles have an internal combustion engine as a primary propulsive power unit, an electric generator motor operable alternatively as an electric motor and an electric generator, and an electric energy storage device such as a battery or a capacitor for supplying stored electric energy to and receiving electric energy for storage from the electric generator motor. When the hybrid vehicle is accelerating, the generator motor is supplied with stored electric energy from the electric energy storage device and operated as an electric motor to generate an assistive output power which is added to the output power (vehicle propulsion power) generated by the engine. When the hybrid vehicle is decelerating, the generator motor is operated as an electric generator by the kinetic energy of the hybrid vehicle to regenerate electric energy, which is stored in the electric energy storage device.

One known control system for a hybrid vehicle of the type described above is disclosed in Japanese laid-open patent publication No. 8-182113, for example. According to the disclosed control system, an integrated charged quantity which represents an integrated quantity of electric energy regenerated by the motor generator and charged into the electric energy storage device is regarded as an allowable discharged quantity that represents a quantity of electric energy which can be discharged from the electric energy storage device to the motor generator when the motor vehicle is to be operated as the electric motor. When the motor generator is operated as the electric motor, the motor generator is controlled so that an integrated discharged quantity which represents an integrated quantity of electric energy discharged from the electric energy storage device will be kept within the allowable discharged quantity, i.e., the supply of electric energy to the motor generator is stopped when the integrated discharged quantity reaches the allowable discharged quantity.

In the above conventional control system, therefore, only the electric energy which has been stored in the electric energy storage device by regenerative operation of the motor generator is used to operate the motor generator as the electric motor when the hybrid vehicle is accelerating, for thereby achieving a balance between charged and discharged quantities of electric energy.

However, since only the electric energy which has been stored in the electric energy storage device by the regenerative operation of the motor generator is used to operate the motor generator as the electric motor for generating an assistive output power to be added to the output power generated by the engine, if the hybrid vehicle is in a situation where the generator motor does not operate frequently in a regenerative mode, such as when the hybrid vehicle runs uphill, then the motor generator cannot operate as the electric motor for generating an assistive output power to be added to the output power generated by the engine. In such a situation, it is difficult to increase the fuel economy of the engine effectively.

Furthermore, if the electric energy storage device is nearly fully charged when the hybrid vehicle starts running, then the generator motor cannot actually operate in the regenerative mode because the electric energy storage device needs to avoid being excessively charged. In such a situation, consequently, the motor generator also fails to operate as the electric motor for generating an assistive output power to be added to the output power generated by the engine. In this situation, furthermore, the electric energy maintained by the electric energy storage device cannot effectively be utilized, and the kinetic energy of the hybrid vehicle upon deceleration thereof cannot sufficiently be recovered by the regenerative operation of the generator motor. As a result, it is difficult to sufficiently increase the efficiency with which the hybrid vehicle utilizes the available energy.

SUMMARY OF THE INVENTION

It is therefore an object of the present invention to provide a control system for a hybrid vehicle which allows an electric generator motor to operate as an electric motor to sufficiently assist in the output power generated by an engine even when the hybrid vehicle is in a situation where the generator motor does not operate frequently in a regenerative mode, and which allows the hybrid vehicle to utilize available energy highly efficiently.

To achieve the above object, there is provided in accordance with the present invention a control system for controlling a hybrid vehicle having an engine as a propulsive power unit for the hybrid vehicle, an electric energy storage device for storing electric energy, and a generator motor operable alternatively as an electric motor for generating an assistive output power to be added to an output power generated by the engine, from the electric energy stored by the electric energy storage device, and as an electric generator for regenerating electric energy to be charged into the electric energy storage device, comprising control means for regarding an integrated charged quantity which represents an integrated value of electric energy quantity charged from the generator motor into the electric energy storage device when the generator motor operates as the electric generator, as an allowable discharged quantity of the electric energy storage device when the generator motor operates as the electric motor, and limiting an integrated discharged quantity which represents an integrated value of electric energy quantity discharged from the electric energy storage device when the generator motor operates as the electric motor, within the allowable discharged quantity, and allowable discharged quantity correcting means for correcting the allowable discharged quantity depending on the electric energy quantity stored by the electric energy storage device when the generator motor starts operating as the electric motor.

With the above arrangement, when the generator motor operates as the electric motor, i.e., when the generator motor generates the assistive output power (assistive propulsive power for the hybrid vehicle) to be added to the output power generated by the engine, the electric energy storage device discharges electric energy, i.e., supplies electric energy to the generator motor, such that the integrated discharged quantity is limited within the allowable discharged quantity.

The allowable discharged quantity has a basic value represented by the integrated charged quantity, which is basically equal to an integrated value of electric energy quantities generated by the generator motor, determined when the generator motor operates as the electric generator before the generator motor operates as the electric motor, and the basic value is corrected by the allowable discharged quantity correcting means depending on the stored electric energy quantity of the electric energy storage device, i.e., the amount of electric energy stored in the electric energy storage device, when the generator motor starts operating as the electric motor.

The allowable discharged quantity which defines an upper limit level for the integrated discharged quantity of the electric energy storage device, which is basically equal to an integrated value of electric energy quantities supplied to the generator motor, when the generator motor operates as the electric motor, reflects the energy stored in the electric energy storage device by regenerative operation of the generator motor and also the energy which is held by the electric energy storage device itself. As a result, when the generator motor operates as the electric motor, it is possible to use not only the energy which has been stored in the electric energy storage device by the regenerative operation of the generator motor, but also the energy held by the electric energy storage device itself. Thus, a sufficient amount of energy necessary to operate the generator motor as the electric motor to generate the assistive output power can be supplied from the electric energy storage device to the generator motor.

Consequently, it is possible to sufficiently assist in the output power generated by the engine with the assistive output power generated by the generator motor operating as the electric motor, and hence to increase the fuel economy of the hybrid vehicle. The efficiency with which the hybrid vehicle utilizes available energy can be increased because not only the energy which has been stored in the electric energy storage device by the regenerative operation of the generator motor, but also the energy held by the electric energy storage device itself can be utilized to operate the generator motor as the electric motor.

The allowable discharged quantity correcting means comprises means for correcting the allowable discharged quantity so as to increase by a corrective quantity if the electric energy quantity stored by the electric energy storage device is greater than a predetermined value.

If the electric energy quantity stored by the electric energy storage device is greater than the predetermined value and is relatively large, then even in a situation where the generator motor operates less frequently as the electric motor to regenerate electric energy, but where an assistive output power for assisting in the output power generated by the engine is demanded, the energy held by the electric energy storage device itself can positively be used to operate the generator motor as the electric motor to generate a sufficient assistive output power and hence increase the fuel economy of the hybrid vehicle. If the electric energy quantity stored by the electric energy storage device is large, then the energy held by the electric energy storage device itself is positively used to operate the generator motor as the electric motor. Therefore, the electric energy quantity stored by the electric energy storage device tends to be smaller than when the electric energy storage device is in a fully charged state. Therefore, the electric energy regenerated by the generator motor can effectively charged into the electric energy storage device, and can effectively be supplied to the generator motor when the generator motor operates as the electric motor, thus increasing the efficiency with which the hybrid vehicle utilizes the available energy. The allowable discharged quantity is not corrected so as to increase if the electric energy quantity stored by the electric energy storage device is less than the predetermined value. Accordingly, when the generator motor generates the assistive output power in a situation where the electric energy quantity stored by the electric energy storage device is relatively small, the discharging of the electric energy storage device is suppressed, and the electric energy storage device is prevented from being excessively discharged.

Preferably, the allowable discharged quantity correcting means comprises means for increasing the corrective quantity as the electric energy quantity stored by the electric energy storage device is greater.

When the generator motor operates as the electric motor, as the electric energy quantity stored by the electric energy storage device is greater, the amount of energy that can be supplied from the electric energy storage device to the generator motor is greater. Therefore, the energy held by the electric energy storage device can effectively be utilized.

If the electric energy quantity stored by the electric energy storage device is less than the predetermined value, the integrated charged quantity may be regarded directly as the allowable discharged quantity, and the allowable discharged quantity may be corrected so as to decrease.

The integrated discharged quantity represents an integrated value electric energy quantities discharged from the electric energy storage device in respective operations of the generator motor as the electric motor, and each time the generator motor operates as the electric motor, the integrated charged quantity is updated to a value produced by subtracting the integrated discharged quantity determined when the generator motor operates as the electric motor from the integrated charged quantity when the generator motor starts operating as the electric motor.

The integrated charged quantity, which is a basic value of the allowable discharged quantity in each of the operations of the generator motor as the electric motor, is obtained by subtracting the total quantity of energy consumed by being supplied from the electric energy storage device to the generator motor prior to the present operation of the generator motor as the electric motor, from the total quantity of energy charged into the electric energy storage device by the regenerative operation of the generator motor prior to the present operation of the generator motor as the electric motor. Stated otherwise, the integrated charged quantity corresponds to an unused quantity of energy of the total quantity of energy charged into the electric energy storage device by the regenerative operation of the generator motor. With the integrated charged quantity regarded as the basic value of the allowable discharged quantity, the energy charged into the electric energy storage device by the regenerative operation of the generator motor can effectively be utilized to operate the generator motor as the electric motor.

The control means comprises means for limiting the integrated discharged quantity within the allowable discharged quantity by canceling the operation of the generator motor as the electric motor when the integrated discharged quantity reaches the allowable discharged quantity while the generator motor is operating as the electric motor.

The generator motor operates as the electric generator when the hybrid vehicle is decelerating or cruising, i.e., running at a substantially constant speed, and operates as the electric motor when the hybrid vehicle is accelerating.

Preferably, the electric energy storage device comprises an electric double-layer capacitor. Though the electric double-layer capacitor has a relatively small capacity, since the hybrid vehicle can utilize the available energy with increased efficiency according to the present invention, the electric double-layer capacitor used as the electric energy storage device can efficiently supply electric energy to the generator motor when the generator motor operates as the electric motor, i.e., can efficiently be discharged without fail, and can also efficiently be charged without fail when the generator motor operates as the electric generator to regenerate electric energy.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 6(*b*) is a diagram showing an allowable discharged quantity at the time the stored electric energy quantity is greater than the predetermined level.

DETAILED DESCRIPTION OF THE PREFERRED EMBODIMENT

Figure 1:
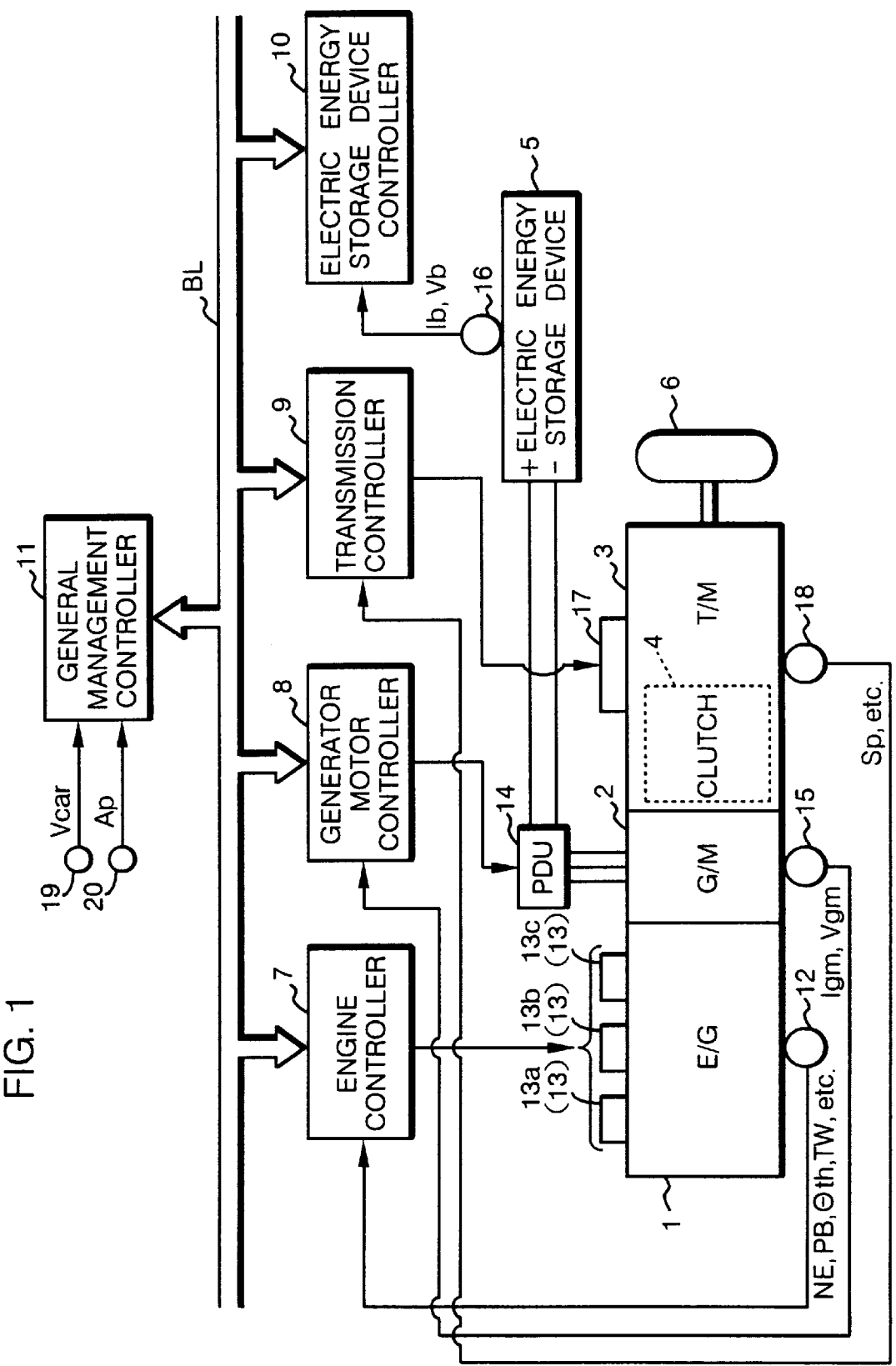
FIG. 1 is a block diagram of a control system for a hybrid vehicle according to the present invention.

FIG. 1 shows in block form a control system for a hybrid vehicle according to the present invention. As shown in FIG. 1, the control system includes an internal combustion engine 1, an electric generator motor 2, a transmission 3 including a clutch 4 and coupled to a drive wheel 6 for moving the hybrid vehicle, an electric energy storage device 5, an engine controller 7, an electric generator motor controller 8, a transmission controller 9, an electric energy storage device controller 10, and a general management controller 11.

The engine 1 serves as a primary propulsive power unit which generates propulsive forces for the hybrid vehicle and has an output shaft (crankshaft) operatively connected through the generator motor 2 and the transmission 3 to the drive wheel 6. The engine 1 transmits generated propulsive forces through the generator motor 2 and the transmission 3 to the drive wheel 6 to propel the hybrid vehicle.

The engine 1 is associated with a detecting device (hereinafter referred to as "engine sensor") 12 for detecting various engine operating states including an engine rotational speed NE, an intake pressure PB, an engine temperature TW, and the opening θth of a throttle valve (intake air control valve), not shown, (hereinafter referred to as "throttle valve opening θth"). Detected data of the above engine operating states are supplied from the engine sensor 12 to the engine controller 7.

The engine 1 is also associated with an engine operating mechanism 13 which includes an ignition unit 13*a* for igniting an air/fuel mixture supplied to the engine 1, a fuel supply unit 13*b* for supplying fuel to the engine 1, and a throttle actuator 13*c* for actuating the throttle valve of the engine 1.

The generator motor 2 has a rotor (not shown) connected coaxially to the output shaft of the engine 1 and an armature coil (not shown) connected electrically to the electric energy storage device 5 via a communication control circuit 14 (hereinafter referred to as "PDU") 14 which comprises a regulator/inverter circuit, etc.

The generator motor 2 is alternatively operable in an assistive mode as an electric motor for generating an assistive output power (an assistive propulsive force which is transmitted, together with the output power from the engine 1, to the drive wheel 6) which assists in the output power from the engine 1 from the electric energy stored in the electric energy storage device 5, and a regenerative mode as an electric generator for generating electric energy to be stored in the electric energy storage device 5 from the kinetic energy transmitted from the drive wheel 6 when the hybrid vehicle decelerates and part of the output power from the engine 1. The operation of the generator motor 2 in each of the above modes is carried out by controlling the transfer of the electric energy to and from the electric energy storage device 5 with the PDU 14.

The generator motor 2 is associated with a detecting device 15 (hereinafter referred to as "generator motor sensor") for detecting a current Igm and a voltage Vgm of the armature coil of the generator motor 2. Detected data of the current Igm and the voltage Vgm are supplied from the generator motor sensor 15 to the generator motor controller 8.

The electric energy storage device 5 comprises an electric double-layer capacitor. The electric energy storage device 5 is associated with a detecting device (hereinafter referred to as "storage device sensor") 16 for detecting charged/discharged currents Ib of the electric energy storage device 5 and a voltage Vb across the electric energy storage device 5, i.e., a voltage between the positive and negative terminals of the electric energy storage device 5. Detected data of the charged/discharged currents Ib and the voltage Vb are supplied from the storage device sensor 16 to the generator motor controller 8.

The charged/discharged currents Ib include a charged current flowing into the electric energy storage device 5 and a discharged current flowing from the electric energy storage device 5. The storage device sensor 16 is capable of separately detecting these currents. The charged current will be denoted by Ibc and the discharged current by Ibd.

The electric energy storage device 5 can supply stored electric energy via a DC/DC converter to a battery (not shown) having a lower voltage (e.g., 12V) than the electric energy storage device 5 and electric accessories including an air-conditioning unit, an audio system, etc. on the hybrid vehicle and energizable by the battery.

While the electric energy storage device 5 comprises an electric double-layer capacitor in the illustrated embodiment, the electric energy storage device 5 may comprise a secondary battery such as a storage battery.

The transmission 3 is operated by the clutch 4 to disconnect the drive wheel 6 from the engine 1 and the generator motor 2 or transmit drive forces, at a selected speed reduction ratio, from the engine 1 and the generator motor 2 to the drive wheel 6. The transmission 3 is combined with an actuator 17 for changing the speed reduction ratio of the transmission 3 and engaging and disengaging the clutch 4. The transmission 3 is associated with a detecting device (hereinafter referred to as "transmission sensor") 18 for detecting operating states of the transmission 3, including a shifted position SP, selected by the driver of the hybrid vehicle, of a gearshift lever (not shown) which controls the speed reduction ratio of the transmission 3. Detected data of the operating states of the transmission 3 are supplied from the transmission sensor 18 to the transmission controller 9.

The controllers 7~11 comprise respective microcomputers and are connected to each other by a bus line BS so that they can exchange data.

Specific processing functions of the controllers 7~11 will be described in detail later on. The engine controller 7 serves to control operation of the engine 1 with the engine operating mechanism 13. The generator motor controller 8 serves to control operation of the generator motor 2 with the PDU 14. The transmission controller 9 serves to control operation of the transmission 3 (including the clutch 4) with the actuator 17. The electric energy storage device controller 10 serves to recognize and monitor operating states of the electric energy storage device 5, including a stored electric energy quantity (remaining capacity) of the electric energy storage device 5 and integrated discharged and charged quantities of electric energy thereof.

The general management controller 11 serves to effect general management on the entire system of the hybrid vehicle. The general management controller 11 recognizes demanded operating states of the hybrid vehicle, determines target operating states for the engine 1 and the generator motor 2, which include a target output power to be generated by the engine 1 and a target assistive output power to be generated by the generator motor 2 in the assistive mode or a target electric output power to be generated by the generator motor 2 in the regenerative mode, depending on the recognized operating states of the hybrid vehicle, and indicates the determined target operating states to the engine controller 7 and the generator motor controller 8. The general management controller 11 is supplied with detected data from a sensor 19 which serves to detect a vehicle speed Vcar of the hybrid vehicle and a sensor 20 which serves to detect an operated quantity Ap of the accelerator pedal (not shown) of the hybrid vehicle (hereinafter referred to as "accelerator operation quantity Ap").

A basic operation of the control system shown in FIG. 1 at the time the hybrid vehicle runs will be described below.

Figure 2:
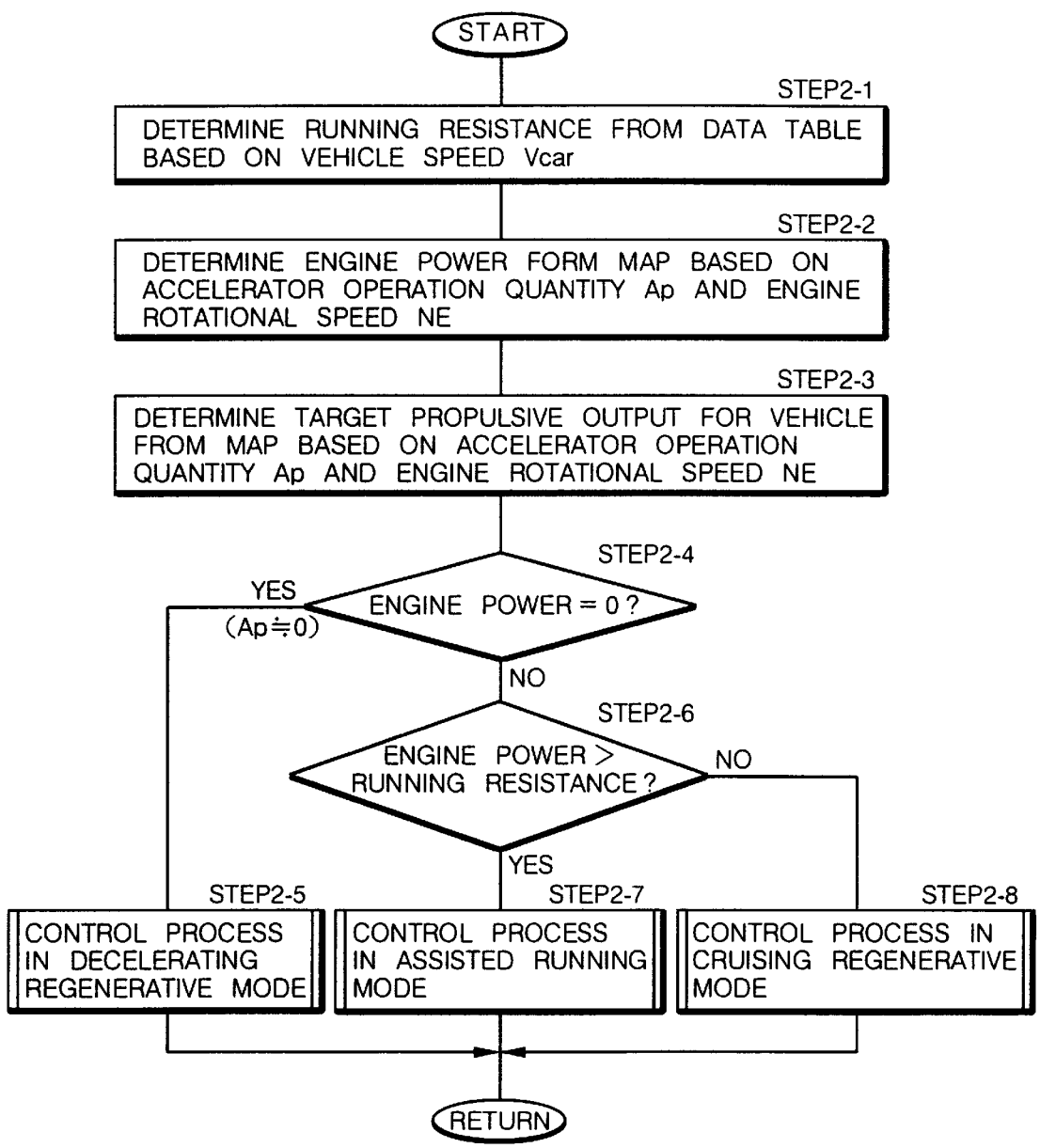
FIG. 2 is a flowchart of a basic operation sequence of the control system shown in FIG. 1.

When the hybrid vehicle runs, the general management controller 11 carries out a basic operation sequence shown in FIG. 2 in predetermined control cycles.

Figure 3:
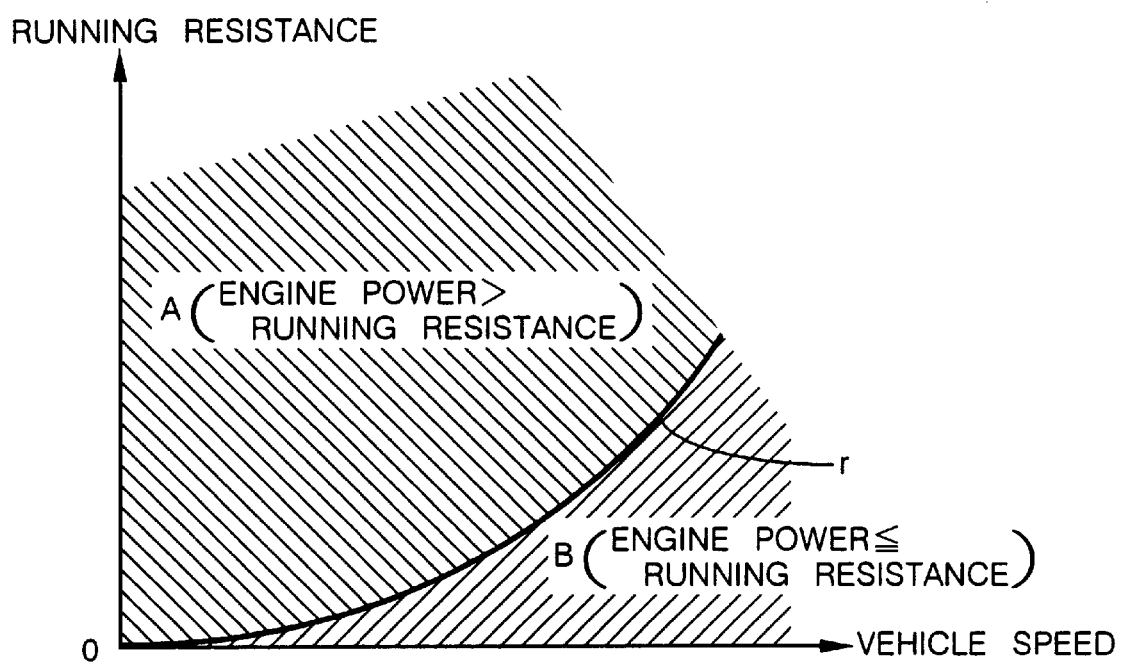
FIG. 3 is a diagram showing a data table for determining a running resistance based on a vehicle speed.

Specifically, the general management controller 11 determines, based on detected data of the vehicle speed Vcar supplied from the sensor 19, a running resistance of the hybrid vehicle at the detected vehicle speed Vcar (a propulsive force required to propel the hybrid vehicle at the detected vehicle speed Vcar) from a predetermined data table as indicated by the solid line "r" in FIG. 3, in STEP 2-1.

The general management controller 11 also determines, based on detected data of the accelerator operation quantity Ap supplied from the sensor 20 and detected data of the engine rotational speed NE of the engine 1 supplied from the engine sensor 12 via the engine controller 7, an output power generated by the engine 1 (hereinafter referred to as "engine power") from a predetermined map if the engine 1 is operated with a throttle opening θth and an engine rotational speed NE which are proportional to the accelerator operation quantity Ap, in STEP 2-2. When the accelerator operation quantity Ap is sufficiently small (≈0), the engine power is "0".

Then, the general management controller 11 determines, based on the detected data of the accelerator operation quantity Ap and the detected data of the engine rotational speed NE, a total target propulsive output power which is demanded for the hybrid vehicle from the accelerator operation quantity Ap and the engine rotational speed NE from a predetermined map in STEP 2-3. If the hybrid vehicle is to run only with the output power from the engine 1, then the target propulsive output power corresponds to the target output power for the engine 1. If the hybrid vehicle is to run with the sum of the output power from the engine 1 and the assistive output power from the generator motor 2 operating in the assistive mode, then the target propulsive output power corresponds to a target value for the sum of the output power from the engine 1 and the assistive output power from the generator motor 2.

The target propulsive output power may be the same as the engine power determined from the accelerator operation quantity Ap and the engine rotational speed NE. In the illustrated embodiment, however, the target propulsive output power is slightly different from the engine power for better running performance of the hybrid vehicle. For example, the target propulsive output power is greater than the engine power in a certain range of rotational speeds NE.

When the accelerator operation quantity Ap is sufficiently small (≈0), the target propulsive output power is "0".

The general management controller 11 decides whether the engine power determined in STEP 2-2 is equal to "0" or not in STEP 2-4. If the engine power is equal to "0", i.e., if the accelerator pedal on the hybrid vehicle is not depressed, then the general management controller 11 determines that a demanded operating state for the hybrid vehicle is a decelerating regenerative mode in which the hybrid vehicle is to be decelerated while the generator motor 2 is operating in the regenerative mode, and then carries out a control process in the decelerating regenerative mode in STEP 2-5.

According to the control process in the decelerating regenerative mode in STEP 2-5, the general management controller 11 determines a target electric output power to be generated by the generator motor 2 in the regenerative mode from a predetermined map based on the present vehicle speed Vcar and the present engine rotational speed NE (which is equal to the rotational speed of the generator motor 2 in this embodiment). The general management controller 11 then indicates the determined target electric output power to the generator motor controller 8. The general management controller 11 also sets the target output power to be generated by the engine 1 to "0", and indicates the target output power thus set to the engine controller 7.

In response to the indicated target output power, the engine controller 7 controls the engine operating mechanism 13 to close the throttle valve of the engine 1, stop supplying the fuel to the engine 1, and stop igniting the air/fuel mixture supplied to the engine 1. Therefore, the output shaft of the engine 1 and the rotor of the generator motor 2 coupled thereto are now rotatable by the kinetic energy of the hybrid vehicle which is transmitted from the drive wheel 6.

In response to the indicated target electric output power, the generator motor controller 8 controls the supply of electric energy from the generator motor 2 to the electric energy storage device 5 with the PDU 14 so that the target electric output power to be generated by the generator motor 2, which is recognized by the detected data of the current Igm and the voltage Vgm from the generator motor sensor 15, will be equalized with the indicated target electric output power. The generator motor 2 now operates in the regenerative mode and charges the electric energy storage device 5 with regenerated electric energy.

If the engine power is not equal to "0" (the engine power>"0"), i.e., if the accelerator pedal on the hybrid vehicle is depressed, in STEP 2-4, then the general management controller 11 decides in STEP 2-6 whether the engine power is greater than the running resistance determined in STEP 2-1. If the engine power is greater than the running resistance, i.e., if the engine power is in a region A in the data table shown in FIG. 3, then the general management controller 11 determines that a demanded operating state for the hybrid vehicle is an assisted running mode in which the hybrid vehicle is to be accelerated while the generator motor 2 is operating in the assistive mode, and then carries out a control process in the assisted running mode in STEP 2-7.

According to the control process in the assisted running mode, the general management controller 11 multiplies the target propulsive output power for the hybrid vehicle determined in STEP 2-3 by a coefficient that is determined depending on the stored electric energy of the electric energy storage device 5 recognized (detected) by the electric energy storage device controller 10 as described later on, a coefficient that is determined depending on the accelerator operation quantity Ap, and a coefficient that is determined depending on an output power margin of the engine power with respect to the running resistance (produced by subtracting the running resistance from the engine power) and the vehicle speed Vcar, for thereby determining a target assistive output power to be generated by the generator motor 2 operating in the assistive mode, of the target propulsive output power for the hybrid vehicle, and indicates the determined target assistive output power to the electric generator motor controller 8.

As the stored electric energy of the electric energy storage device 5 is greater, the electric energy storage device 5 can supply a greater quantity of electric energy to the generator motor 2, so that the coefficient that is determined depending on the stored electric energy of the electric energy storage device 5 is determined from the stored electric energy using a non-illustrated data table in order to increase the target assistive output power to be generated by the generator motor 2. As the accelerator operation quantity Ap is close to its maximum level, a large accelerating force is demanded for the hybrid vehicle, so that the coefficient that is determined depending on the accelerator operation quantity Ap is determined from the detected data of the accelerator operation quantity Ap using a non-illustrated data table in order to increase the target assistive output power to be generated by the generator motor 2. As the output power margin is larger and the vehicle speed Vcar is lower, a larger accelerating force is demanded for the hybrid vehicle, so that the coefficient that is determined depending on the output power margin and the vehicle speed Vcar is determined from the output power margin and the vehicle speed Vcar using a non-illustrated data table in order to increase the target assistive output power to be generated by the generator motor 2.

The general management controller 11 sets the target output power to be generated by the engine 1 to a power level produced by subtracting the target assistive output power from target propulsive output power, and indicates the target output power to be generated by the engine 1 to the engine controller 7.

In order to control the engine 1 to generate the indicated target output power, the engine controller 7 determines a throttle valve opening θth, an amount of fuel to be supplied, and ignition timing for the engine 1 while referring to the detected data from the engine sensor 12. The engine controller 7 then indicates the determined throttle valve opening θth, amount of fuel to be supplied, and ignition timing to the engine operating mechanism 13 for thereby controlling the output power generated by the engine 1.

The generator motor controller 8 supplies electric energy from the electric energy storage device 5 via the PDU 14 to the generator motor 2 to control the generator motor 2 to operate in the assistive mode. Furthermore, the generator motor controller 8 causes the PDU unit 14 to control the amount of electric energy supplied from the electric energy storage device 5 to the generator motor 2 so as to equalize the assistive output power generated by the generator motor 2 with the indicated target assistive output power.

The engine 1 and the generator motor 2 now generate the target output power and the target assistive output power, respectively, and their sum, i.e., the target target propulsive output power, is transmitted via the transmission 3 to the drive wheel 6 for thereby accelerating the hybrid vehicle.

In the assisted running mode, an upper limit level is established for an integrated value of the discharged quantity, from time to time, from the electric energy storage device 5 which supplies stored electric energy to the generator motor 2. When the integrated discharged quantity exceeds the upper limit level, the supply of stored electric energy from the electric energy storage device 5 to the generator motor 2 is stopped, as described later on.

If the engine power is equal to or smaller than the running resistance, i.e., if the engine power is in a region B in the data table shown in FIG. 3, then the general management controller 11 determines that a demanded operating state for the hybrid vehicle is a cruising regenerative mode in which the hybrid vehicle is to be cruising, i.e., running at a substantially constant speed, while the generator motor 2 is operating in the regenerative mode using part of the output power from the engine 1, and then carries out a control process in the cruising regenerative mode in STEP 2-8.

According to the control process in the cruising regenerative mode, the general management controller 11 determines a target electric output power to be generated by the generator motor 2 in the regenerative mode from a predetermined map based on the present stored electric energy quantity of the electric energy storage device 5, the present engine rotational speed NE, and the present vehicle speed Vcar recognized by the electric energy storage device controller 10 as described later on. The general management controller 11 then indicates the determined target electric output power to the generator motor controller 8. The general management controller 11 also sets the target output power to be generated by the engine 1 to the sum of the target propulsive output power determined in STEP 2-3 and an output power corresponding to the target assistive output power to be generated by the generator motor 2, and indicates the target output power thus set to the engine controller 7.

In order to control the engine 1 to generate the indicated target output power, the engine controller 7 determines a throttle valve opening θth, an amount of fuel to be supplied, and ignition timing for the engine 1, and then indicates the determined throttle valve opening θth, amount of fuel to be supplied, and ignition timing to the engine operating mechanism 13 for thereby controlling the output power generated by the engine 1.

The generator motor controller 8 controls the supply of electric energy from the generator motor 2 to the electric energy storage device 5 with the PDU 14 so that the generator motor 2 will generate the indicated target electric output power, operates the generator motor 2 in the regenerative mode, and charges the electric energy storage device 5 with regenerated electric energy. A portion of the output power generated by the engine 1 which corresponds to the electric output power generated by the generator motor 2 is used as an energy source for operating the generator motor 2 in the regenerative mode, and the remaining output power (=the propulsive output power for the hybrid vehicle) is transmitted via the transmission 3 to the drive wheel 6.

While the hybrid vehicle is running in each of the decelerating regenerative mode, the assisted running mode, and the cruising regenerative mode, the transmission controller 9 controls the actuator 17 to change the speed reduction ratio of the transmission 3 based on the shifted position SP of the gearshift lever which is detected by the transmission sensor 18. While the hybrid vehicle is running, the clutch 4 is kept engaged.

The general management controller 11 carries out the basic operation sequence as described above.

While the hybrid vehicle is operating as described above, the electric energy storage device controller 10 recognizes the stored electric energy of the electric energy storage device 5, and calculates and establishes an allowable discharged quantity from the electric energy storage device 5, i.e., an upper limit level for the energy quantity that is allowed to be discharged from the electric energy storage device 5, when the generator motor 2 is supplied with the stored electric energy from the electric energy storage device 5 to operate in the assistive mode. To perform these functions, the electric energy storage device controller 10 has functional blocks as shown in FIG. 4.

Figure 4:
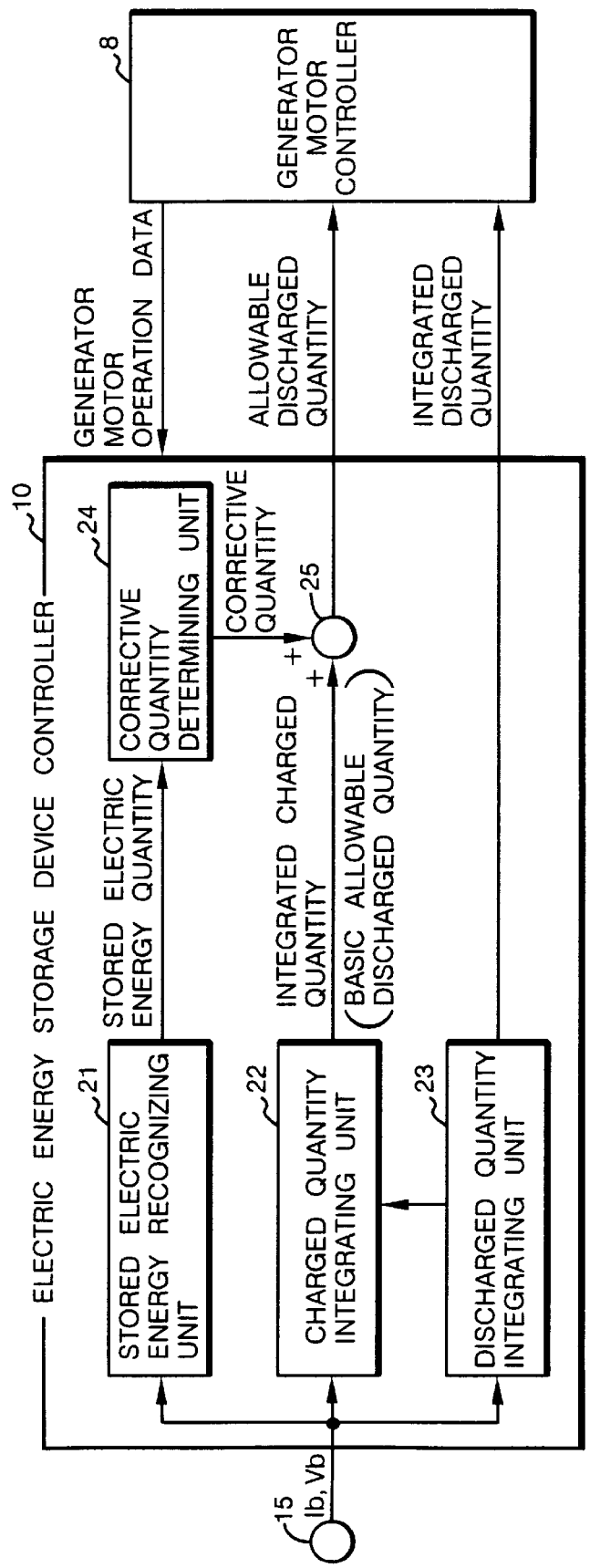
FIG. 4 is a block diagram of an electric generator motor controller and an electric energy storage device controller in the control system shown in FIG. 1.

In FIG. 4, the electric energy storage device controller 10 comprises a stored electric energy recognizing unit 21 for recognizing a stored electric energy quantity (remaining capacity) of the electric energy storage device 5, a charged quantity integrating unit 22 for determining an integrated value of the charged quantity supplied to the electric energy storage device 5 at the time the generator motor 2 operates in the regenerative mode, as a basic allowable discharged quantity (a basic value of allowable discharged quantity) each time the generator motor 2 operates in the assistive mode, a discharged quantity integrating unit 23 for determining an integrated discharged quantity representing an integrated value of discharged quantity from the electric energy storage device 5 each time the generator motor 2 operates in the assistive mode, a corrective quantity determining unit 24 for determining a corrective quantity to correct the basic allowable discharged quantity depending on the stored electric energy of the electric energy storage device 5 at the generator motor 2 starts to operate in the assistive mode, and an allowable discharged quantity determining unit 25 for adding the corrective quantity to the basic allowable discharged quantity thereby to determine an allowable discharged quantity which represents the corrected basic allowable discharged quantity. The corrective quantity determining unit 24 and the allowable discharged quantity determining unit 25 correspond to an allowable discharged quantity correcting means.

The stored electric energy recognizing unit 21 recognizes a stored electric energy quantity (remaining capacity) of the electric energy storage device 5 from time to time as follows: The stored electric energy recognizing unit 21 determines the product of the detected values of the charged/discharged currents Ib of the electric energy storage device 5 and the voltage Vb across the electric energy storage device 5, which are given from the storage device sensor 16, i.e., charged/discharged powers, in each of given control cycles. Then, the stored electric energy recognizing unit 21 integrates, i.e., cumulatively adds values produced by multiplying the charged/discharged powers by the periodic time of the control cycles, which values correspond to charged or discharged energy quantities of the electric energy storage device 5 in the respective control cycles, from the fully charged state of the electric energy storage device 5 successively in the respective control cycles. If the discharged power from the electric energy storage device 5 is regarded as positive and the charged power supplied to the electric energy storage device 5 as negative, then the above integrating process produces a total amount of charged and discharged quantities of the electric energy storage device 5 from its fully charged state, i.e., an amount produced by subtracting the total quantity of electric energy charged into the electric energy storage device 5 from the total quantity of electric energy discharged from the electric energy storage device 5. The stored electric energy recognizing unit 21 then subtracts the total amount of charged and discharged quantities from the total quantity of electric energy that can be discharged by the electric energy storage device 5 from its fully charged state, i.e., the capacity of the electric energy storage device 5 at its fully charged state, for thereby recognizing a stored electric energy quantity (remaining capacity) of the electric energy storage device 5. There are also available other methods for recognizing a stored electric energy quantity (remaining capacity) of the electric energy storage device 5. For example, the stored electric energy recognizing unit 21 may recognize a stored electric energy quantity (remaining capacity) of the electric energy storage device 5 while correcting it depending on the temperature of the electric energy storage device 5, or may recognize a stored electric energy quantity (remaining capacity) of the electric energy storage device 5 solely from the voltage Vb across the electric energy storage device 5.

The discharged quantity integrating unit 23 determines the product of the detected values of the discharged current Ibd of the electric energy storage device 5 and the voltage Vb across the electric energy storage device 5, which are given from the storage device sensor 16, i.e., a discharged power, in each of given control cycles when the generator motor 2 operates in the assistive mode. The discharged quantity integrating unit 23 integrates, i.e., cumulatively adds values produced by multiplying the discharged power by the periodic time of the control cycles, which values correspond to discharged energy quantities of the electric energy storage device 5 in the respective control cycles, successively in the respective control cycles. Then, the discharged quantity integrating unit 23 determines the integrated value as an integrated discharged quantity, and supplies the integrated discharged quantity to the electric generator motor controller 8. When the hybrid vehicle starts operating, the discharged quantity integrating unit 23 initializes the integrated discharged quantity to "0". When the generator motor 2 starts operating in the assistive mode, the discharged quantity integrating unit 23 supplies the integrated discharged quantity which has been determined and held in the preceding operation in the assistive mode to the charged quantity integrating unit 22, and thereafter resets the integrated discharged quantity to "0". The electric energy storage device controller 10 is supplied with data (hereinafter referred to as "generator motor operation data") indicative of an operating state (the assistive mode or the regenerative mode) of the generator motor 2 from the electric generator motor controller 8. The discharged quantity integrating unit 23 decides whether the generator motor 2 is in the assistive mode or not based on the supplied generator motor operation data.

The charged quantity integrating unit 22 determines the product of the detected values of the charged current Ibc of the electric energy storage device 5 and the voltage Vb across the electric energy storage device 5, which are given from the storage device sensor 16, i.e., a charged power, in each of given control cycles when the generator motor 2 operates in the regenerative mode as recognized on the basis of the generator motor operation data. The charged quantity integrating unit 22 integrates, i.e., cumulatively adds values produced by multiplying the charged power by the periodic time of the control cycles, which values correspond to charged energy quantities of the electric energy storage device 5 in the respective control cycles, successively in the respective control cycles, for thereby determining an integrated charged quantity (basic allowable charged quantity). When the hybrid vehicle starts operating, the charged quantity integrating unit 22 initializes the integrated charged quantity to "0". When the generator motor 2 starts operating in the assistive mode, the charged quantity integrating unit 22 subtracts the integrated charged quantity from the integrated charged quantity which has been determined in the preceding operation of the generator motor 2 in the regenerative mode, thus updating the integrated charged quantity. When the generator motor 2 operates next time in the regenerative mode, the charged quantity integrating unit 22 integrates a charged power using the updated integrated charged quantity as an initial value.

Figure 5:
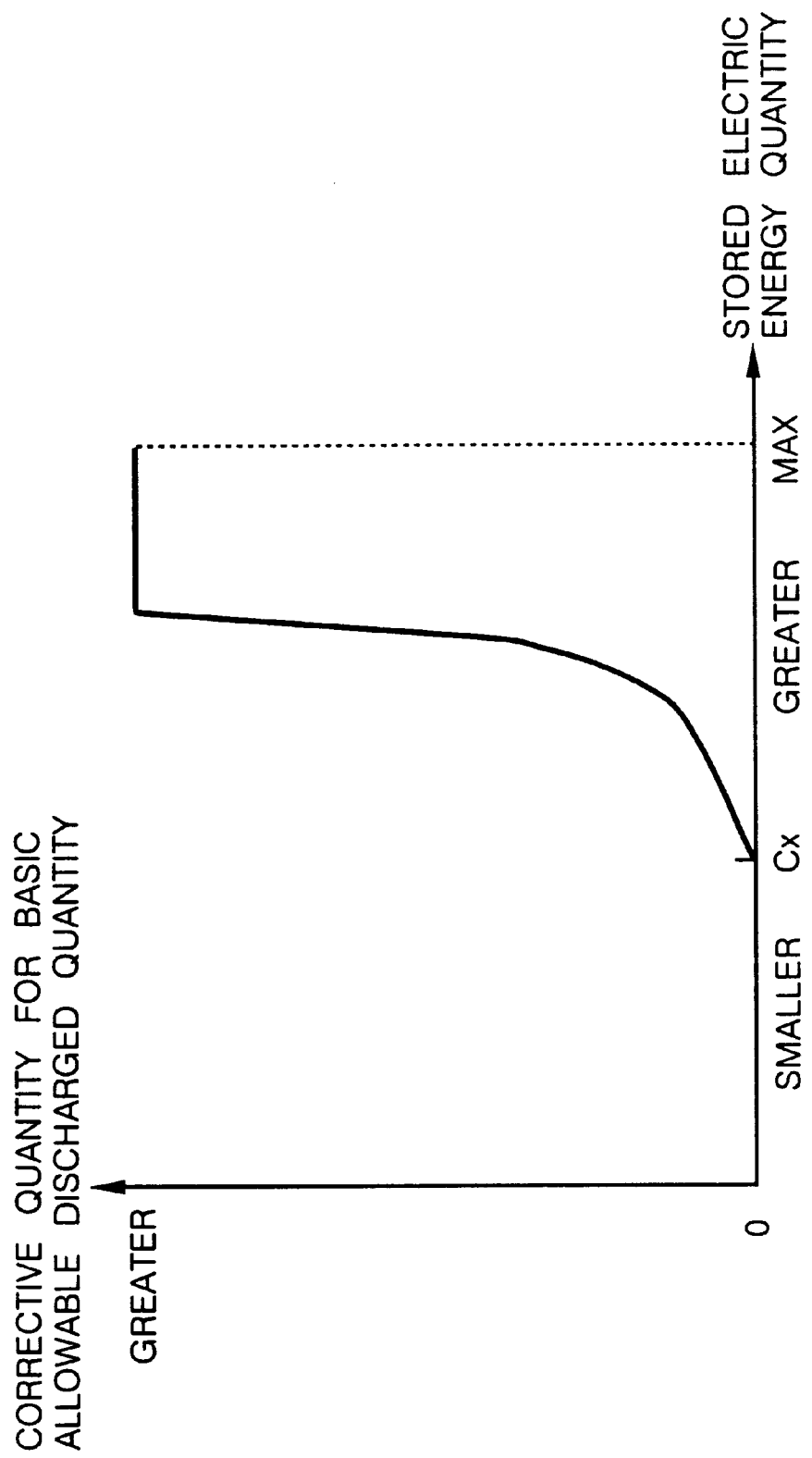
FIG. 5 is a diagram showing a data table for determining a corrective quantity for a basic allowable discharged quantity based on a stored electric energy quantity.

The corrective quantity determining unit 24 determines a corrective quantity for the basic allowable discharged quantity from a data table shown in FIG. 5 based on the stored electric energy quantity recognized by the stored electric energy recognizing unit 21 when the generator motor 2 starts to operate in the assistive mode as recognized on the basis of the generator motor operation data. The corrective quantity represents an increment to be added to the basic allowable discharged quantity, which is determined depending on the integrated charged quantity. If the stored electric energy quantity of the electric energy storage device 5 is equal to or smaller than a predetermined value Cx (see FIG. 6(*a*)), then the corrective quantity is set to "0". If the stored electric energy quantity of the electric energy storage device 5 is greater than the predetermined value Cx (see FIG. 6(*b*)), then the corrective quantity is greater as the stored electric energy quantity of the electric energy storage device 5 is greater.

Figure 6A:
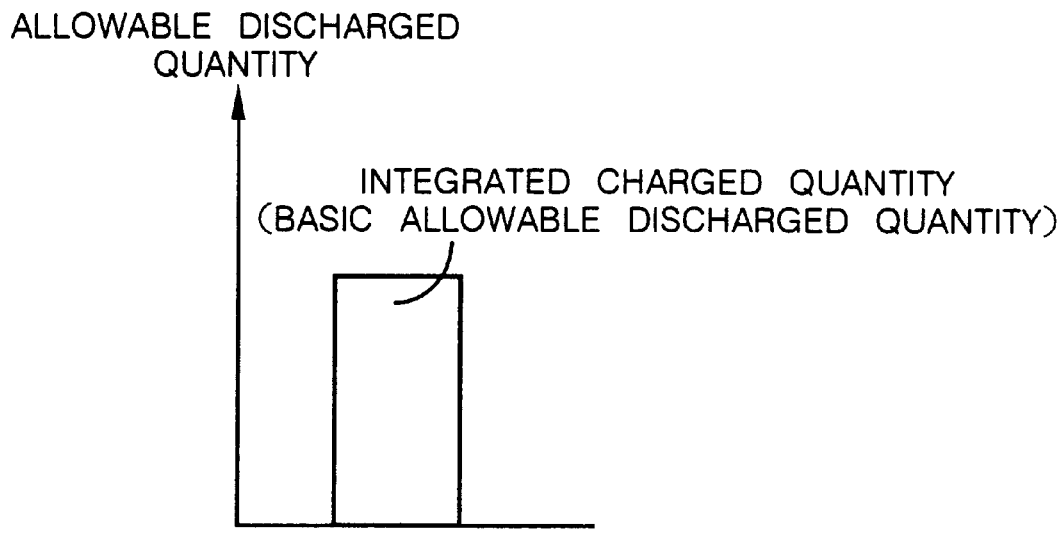
FIG. 6(*a*) is a diagram showing an allowable discharged quantity at the time the stored electric energy quantity is equal to or smaller than a predetermined level.
Figure 6B:
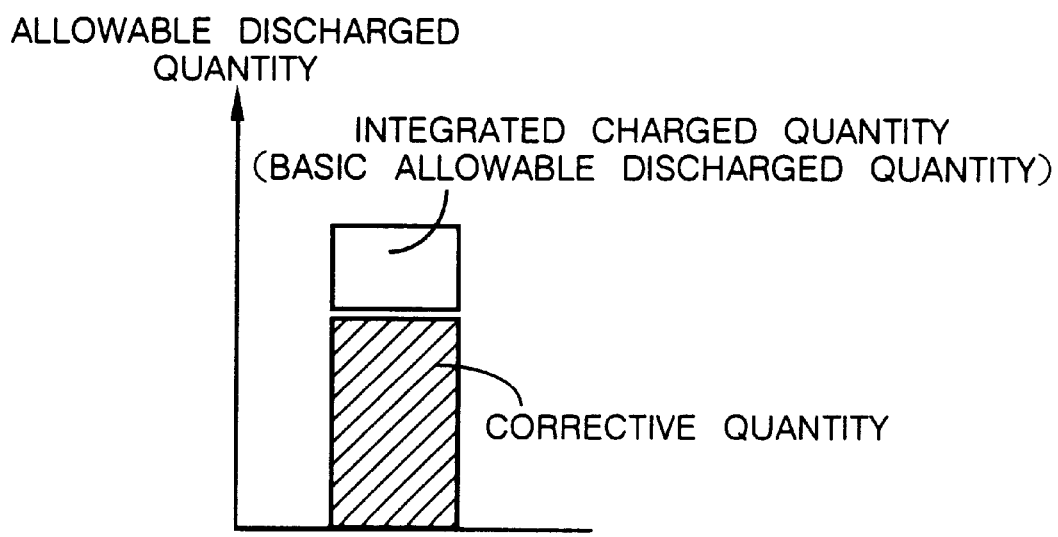

The allowable discharged quantity determining unit 25 adds the corrective quantity determined by the corrective quantity determining unit 24 at the time the generator motor 2 starts operating in the assistive mode, to the integrated charged quantity, i.e., the basic allowable discharged quantity, calculated and held at the time by the charged quantity integrating unit 22, for thereby determining a final allowable discharged quantity for the present operation of the generator motor 2 in the assistive mode. The allowable discharged quantity determining unit 25 supplies the final allowable discharged quantity thus determined to the electric generator motor controller 8. As shown in FIG. 6(*a*), if the stored electric energy quantity of the electric energy storage device 5 is equal to or smaller than the predetermined value Cx, then the integrated charged quantity, i.e., the basic allowable discharged quantity, is determined directly as the allowable discharged quantity. As shown in FIG. 6(*b*), if the stored electric energy quantity of the electric energy storage device 5 is greater than the predetermined value Cx, then the sum of the corrective quantity (>0) and the integrated charged quantity, i.e., the basic allowable discharged quantity, is determined as the allowable discharged quantity.

Figure 7:
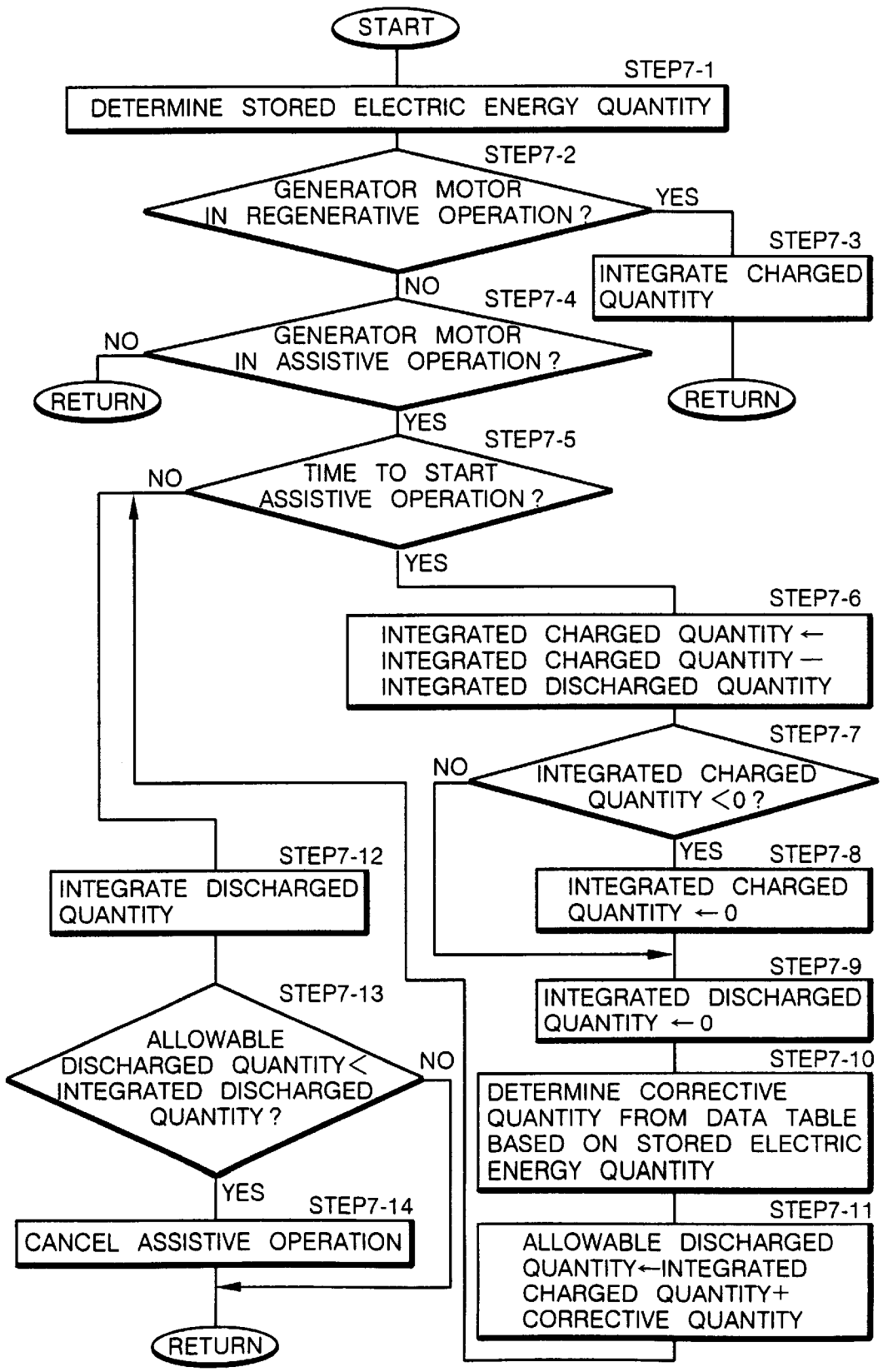
FIG. 7 is a flowchart of an operation sequence of the control system shown in FIG. 1.

The electric energy storage device controller 10 and the electric generator motor controller 8 perform an operation sequence shown in FIG. 7 in predetermined control cycles.

As shown in FIG. 7, the stored electric energy recognizing unit 21 of the electric energy storage device controller 10 determines a present stored electric energy quantity of the electric energy storage device 5 in STEP 7-1.

Then, the electric energy storage device controller 10 decides whether the generator motor 2 operates in the regenerative mode (the decelerating regenerative mode or the cruising regenerative mode) as recognized on the basis of the generator motor operation data supplied from the electric generator motor controller 8 in STEP 7-2.

If the generator motor 2 operates in the regenerative mode, then the charged quantity integrating unit 22 integrates the product of the charged power of the electric energy storage device 5 (≈the regenerated electric energy from the generator motor 2) and the periodic time of the control cycles in STEP 7-3, and the processing in the present control cycle is finished. The charged quantity integrating unit 22 integrates the product by adding the product of the charged power and the periodic time, determined in the present control cycle, to the integrated charged quantity in the preceding control cycle.

If the generator motor 2 does not operate in the regenerative mode in STEP 7-2, then the electric energy storage device controller 10 decides whether the generator motor 2 operates in the assistive mode (the assisted running mode) or not on the basis of the generator motor operation data in STEP 7-4.

If the generator motor 2 does not operate in the assistive mode (in this case, the generator motor 2 does not operate in the regenerative mode either), the processing in the present control cycle is finished.

If the generator motor 2 operates in the assistive mode, then the electric energy storage device controller 10 compares the generator motor operation data in the preceding control cycle, for example, with the generator motor operation data in the present control cycle to decide whether the present time is the time when the generator motor 2 starts operating in the assistive mode or not in STEP 7-5. If the present time is not the time when the generator motor 2 starts operating in the assistive mode, i.e., if the generator motor 2 has continuously been operating in the assistive mode, then control jumps to STEP 7-12.

If the present time is the time when the generator motor 2 starts operating in the assistive mode, then the charged quantity integrating unit 22 subtracts the integrated discharged quantity presently held by the discharged quantity integrating unit 23 (an initial value of the integrated discharged quantity at the time the generator motor 2 starts operating in the assistive mode after the hybrid vehicle has started running is "0") from the integrated charged quantity present held by the charged quantity integrating unit 22 for thereby updating the integrated charged quantity in STEP 7-6. Then, the charged quantity integrating unit 22 decides the updated integrated charged quantity is smaller than "0" or not in STEP 7-7. If the updated integrated charged quantity is smaller than "0", then the charged quantity integrating unit 22 resets the integrated charged quantity to "0" in STEP 7-8. Then, the discharged quantity integrating unit 23 resets the integrated discharged quantity to "0" in STEP 7-9. The processing in STEPs 7-6 through 7-9 may be carried out when the operation of the generator motor 2 in the assistive mode is finished.

Then, in STEP 7-10, the corrective quantity determining unit 24 determines a corrective quantity from the data table shown in FIG. 5 based on the stored electric energy quantity of the electric energy storage device 5 which has been determined by the stored electric energy recognizing unit 21 in STEP 7-1. The allowable discharged quantity determining unit 25 adds the corrective quantity to the integrated charged quantity, i.e., the basic allowable discharged quantity, presently held by the charged quantity integrating unit 22, for thereby determining a final allowable discharged quantity in STEP 7-11. Then, control goes to STEP 7-12. The allowable discharged quantity determined in STEP 7-11 is in accord with the integrated charged quantity (the corrective quantity="0") if the stored electric energy quantity of the electric energy storage device 5 is equal to or smaller than the predetermined value Cx, and is greater than the integrated charged quantity by the corrective quantity (the corrective quantity>"0") if the stored electric energy quantity of the electric energy storage device 5 is greater than the predetermined value Cx. The determined allowable discharged quantity is supplied to the electric generator motor controller 8.

In STEP 7-12, the discharged quantity integrating unit 23 integrates the product of the discharged power of the electric energy storage device 5 (≈the electric energy supplied to the generator motor 2 to operate the generator motor 2 in the assistive mode) and the periodic time of the control cycles. The discharged quantity integrating unit 23 integrates the product by adding the product of the discharged power and the periodic time, determined in the present control cycle, to the present value of the integrated discharged quantity. The integrated discharged quantity thus determined is supplied to the electric generator motor controller 8 in each control cycle.

In response to the allowable charged quantity and the integrated discharged quantity which are supplied when the generator motor 2 operates in the assistive mode, the generator motor controller 8 compares the allowable charged quantity and the integrated discharged quantity with each other in STEP 7-13. If the allowable charged quantity is equal to or greater than the integrated discharged quantity, i.e., if the quantity of electric energy discharged by the electric energy storage device 5 upon the operation of the generator motor 2 in the assistive mode has not yet reached the allowable discharged quantity, then the present control cycle is finished while continuing the operation of the generator motor 2 in the assistive mode.

If the integrated discharged quantity exceeds the allowable discharged quantity in STEP 7-13, then the supply of electric energy to the generator motor 2 via the PDU 14 is stopped, thereby canceling the operation of the generator motor 2 in the assistive mode in STEP 7-14. The processing in the present control cycle is now completed. Thus, the total amount of discharged quantity of the electric energy storage device 5 in each operation of the generator motor 2 in the assistive mode (≈the total amount of electric energy supplied to the generator motor 2) is limited below the allowable discharged quantity which serves as an upper limit level. Even after the operation of the generator motor 2 in the assistive mode is canceled, if the demanded operating state for the hybrid vehicle is continuously the assisted running mode, then the general management controller 11 controls the engine controller 7 to control the output power of the engine 1 at the target output power.

In the hybrid vehicle according to the above embodiment, as described above, the integrated charged quantity of the electric energy storage device 5 at the time the generator motor 2 operates in the regenerative mode is regarded as the basic allowable discharged quantity of the electric energy storage device 5, i.e., the basic upper limit level for the energy quantity that is allowed to be discharged from the electric energy storage device 5, at the time the generator motor 2 operates in the assistive mode. If the stored electric energy quantity of the electric energy storage device 5 is relatively large and the amount of energy held by the electric energy storage device 5 itself has a margin when the generator motor 2 starts operating in the assistive mode, then the sum of the basic allowable discharged quantity and the corrective quantity depending on the stored electric energy quantity becomes an actual allowable discharged quantity upon operation of the generator motor 2 in the assistive mode. The corrective quantity is greater as the stored electric energy quantity is larger. Consequently, the generator motor 2 can operate in the assistive mode using not only the energy which has been stored in the electric energy storage device 5 by regenerative operation of the generator motor 2, but also the margin of the energy held by the electric energy storage device 5 itself. As a result, even if the amount of energy demanded by the operation of the generator motor 2 in the assistive mode or a period of time in which to operate the generator motor 2 in the assistive mode is relatively large, the generator motor 2 can sufficiently be operated in the assistive mode, and the consumption of fuel by the engine 1 can be minimized.

Since if the stored electric energy quantity of the electric energy storage device 5 is relatively large, then the margin of the energy held by the electric energy storage device 5 itself is also used to operate the generator motor 2 in the assistive mode, the stored electric energy quantity of the electric energy storage device 5 tends to be smaller than when the electric energy storage device 5 is in the fully charged state. Therefore, even in a situation where the hybrid vehicle operates frequently in the decelerating regenerative mode, e.g., when the hybrid vehicle runs on a long downhill, the electric energy storage device 5 is prevented from being excessively charged. At the same time, the electric energy storage device 5 can store a sufficient amount of electric energy generated by the generator motor 2 which is operated in the regenerative mode by the kinetic energy of the hybrid vehicle as it decelerates. Therefore, it is possible to increase the efficiency with which the hybrid vehicle utilizes the available energy. This advantage manifests itself particularly if the electric energy storage device 5 comprises an electric double-layer capacitor.

If the stored electric energy quantity of the electric energy storage device 5 is relatively small when the generator motor 2 starts operating in the assistive mode, then only the electric energy, i.e., the integrated charged quantity, which has been stored in the electric energy storage device 5 by regenerative operation of the generator motor 2 is used to operate the generator motor 2 in the assistive mode. Accordingly, the electric energy storage device 5 is prevented from being excessively discharged and hence from being unduly deteriorated.

The integrated discharged quantity determined by the discharged quantity integrating unit 23 represents an integrated value of discharged quantities in respective operations of the generator motor 2 in the assistive mode. Each time the generator motor 2 starts operating in the assistive mode, the integrated charged quantity which is regarded as the basic allowable discharged quantity is updated to a value produced by subtracting the integrated discharged quantity from the integrated charged quantity that has been determined up to the time the generator motor 2 starts operating in the assistive mode. Therefore, the basic discharged quantity is equal to a value produced by subtracting the total quantity of electric energy discharged from the electric energy storage device 5 to operate the generator motor 2 in the assistive mode from the total quantity of electric energy charged into the electric energy storage device 5 by the operation of the generator motor 2 in the regenerative mode, before the generator motor 2 starts to operate. Consequently, the electric energy stored in the electric energy storage device 5 by the regenerative operation of the generator motor 2 can effectively be utilized as an energy source for operating the generator motor 2 in the assistive mode.

In the illustrated embodiment, the allowable discharged quantity is corrected so as to increase from the basic allowable discharged quantity only if the stored electric energy quantity of the electric energy storage device 5 is relatively large. However, if the stored electric energy quantity of the electric energy storage device 5 is relatively small, the allowable discharged quantity may be corrected so as to decrease from the basic allowable discharged quantity.

Although a certain preferred embodiment of the present invention has been shown and described in detail, it should be understood that various changes and modifications may be made therein without departing from the scope of the appended claims.

What is claimed is:

1. A control system for controlling a hybrid vehicle having an engine as a propulsive power unit for the hybrid vehicle, an electric energy storage device for storing electric energy, and a generator motor operable alternatively as an electric motor for generating an assistive output power to be added to an output power generated by the engine, from the electric energy stored by the electric energy storage device, and as an electric generator for regenerating electric energy to be charged into the electric energy storage device, comprising:

control means for regarding an integrated charged quantity which represents an integrated value of electric energy quantity charged from the generator motor into the electric energy storage device when the generator motor operates as the electric generator, as an allowable discharged quantity of the electric energy storage device when the generator motor operates as the electric motor, and limiting an integrated discharged quantity which represents an integrated value of electric energy quantity discharged from the electric energy storage device when the generator motor operates as the electric motor, within said allowable discharged quantity; and allowable discharged quantity correcting means for correcting said allowable discharged quantity depending on the electric energy quantity stored by the electric energy storage device when the generator motor starts operating as the electric motor.

2. A control system according to claim 1, wherein said allowable discharged quantity correcting means comprises means for correcting said allowable discharged quantity so as to increase by a corrective quantity if the electric energy quantity stored by the electric energy storage device is greater than a predetermined value.

3. A control system according to claim 2, wherein said allowable discharged quantity correcting means comprises means for increasing said corrective quantity as the electric energy quantity stored by the electric energy storage device is greater.

4. A control system according to any one of claims 1 through 3, wherein said integrated discharged quantity represents an integrated value electric energy quantities discharged from the electric energy storage device in respective operations of the generator motor as the electric motor, and each time the generator motor operates as the electric motor, said integrated charged quantity is updated to a value produced by subtracting the integrated discharged quantity determined when the generator motor operates as the electric motor from the integrated charged quantity when the generator motor starts operating as the electric motor.

5. A control system according to claim 1, wherein said control means comprises means for limiting said integrated discharged quantity within said allowable discharged quantity by canceling the operation of the generator motor as the electric motor when said integrated discharged quantity reaches said allowable discharged quantity while the generator motor is operating as the electric motor.

6. A control system according to claim 1, wherein said generator motor operates as the electric generator when the hybrid vehicle is decelerating or cruising and operates as the electric motor when the hybrid vehicle is accelerating.

7. A control system according to claim 1, wherein said electric energy storage device comprises an electric double-layer capacitor.

* * * * *